United States Patent [19]

Bäbler et al.

[11] Patent Number: 4,692,189
[45] Date of Patent: Sep. 8, 1987

[54] NOVEL COMPOSITIONS BASED ON INDANTHRONE BLUE PIGMENTS

[75] Inventors: Fridolin Bäbler, Marly, Switzerland; Edward E. Jaffe, Wilmington, Del.; Bernhard Medinger, Giffers, Switzerland

[73] Assignee: Ciba-Geigy Corporation, Ardsley, N.Y.

[21] Appl. No.: 887,776

[22] Filed: Jul. 21, 1986

[51] Int. Cl.$^4$ .............................. C04B 14/00
[52] U.S. Cl. ..................... 106/308 S; 106/288 R; 544/339
[58] Field of Search ............................. 106/288, 308 S; 544/339

[56] References Cited

U.S. PATENT DOCUMENTS

| | | | |
|---|---|---|---|
| 1,731,800 | 10/1929 | Thompson | 544/339 |
| 1,975,248 | 10/1934 | Bishop et al. | 544/339 |
| 4,167,634 | 9/1979 | Hoch et al. | 544/339 |
| 4,350,534 | 9/1982 | Fechner et al. | 544/339 |

FOREIGN PATENT DOCUMENTS 1001707   7/1966   Japan .

Primary Examiner—Paul Lieberman
Assistant Examiner—Willie J. Thompson
Attorney, Agent, or Firm—Harry Falber

[57] ABSTRACT

A composition comprising
(a) an indanthrone blue pigment of formula I

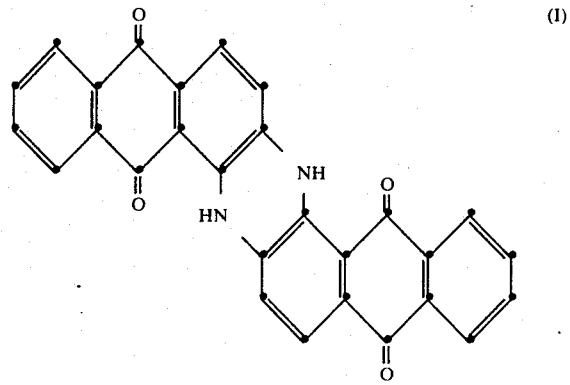

and
(b) a sulfonated indanthrone blue derivative of formula II

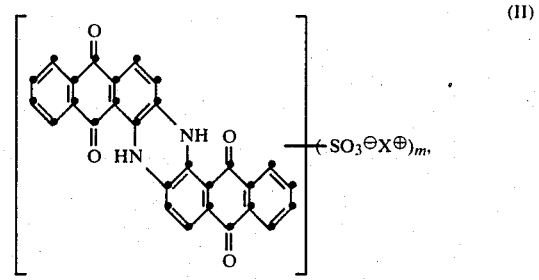

wherein $X^\oplus$ is $H^\oplus$ or a group of the formula $M^{n\oplus}/n$ or $N^\oplus(R)(R_1)(R_2)(R_3)$, M is a monovalent, divalent or trivalent metal cation, n is 1, 2 or 3, each of R, $R_1$, $R_2$ and $R_3$ is independently hydrogen, $C_1$-$C_{18}$-alkyl, $C_5$-$C_6$cycloalkyl, phenyl or phenyl which is substituted by $C_1$-$C_{18}$alkyl, or $R_2$ and $R_3$, together with the linking nitrogen atom, are a pyrrolidine, imidazoline, piperidine, piperazine or morpholine radical, or $R_1$, $R_2$ and $R_3$, together with the linking nitrogen atom, are a pyrrole, pyridine, picoline, pyrazine, quinoline or isoquinoline radical, and m is a value from 0.2 to 3.

When used in varnishes, pigment mixtures of this kind are distinguished in particular by increased color strength, improved rheology and high gloss.

5 Claims, No Drawings

NOVEL COMPOSITIONS BASED ON INDANTHRONE BLUE PIGMENTS

The present invention relates to a composition containing an indanthrone blue pigment and a sulfonated indanthrone blue derivative, and to the use of said composition for colouring high molecular organic material.

Indanthrone blue pigment has long been known. The improvement of the solvent resistance of indanthrone blue by adding 30% by weight of a sulfonated copper phthalocyanine, based on indanthrone blue, has been described in Japanese published patent specification 71-1707.

Surprisingly, it has now been found that the addition of a sulfonated indanthrone blue derivative to an indanthrone blue pigment affords a pigment mixture having increased colour strength and improved rheological properties.

Accordingly, the present invention relates to a composition comprising (a) an indanthrone blue pigment of formula I

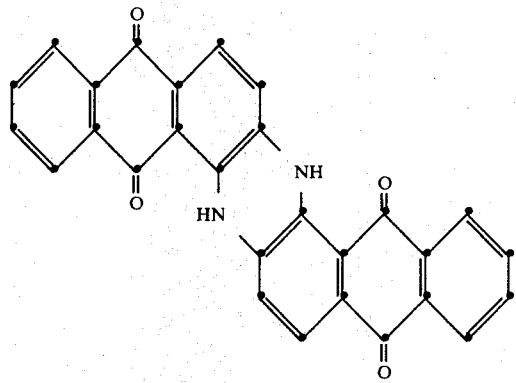

and (b) a sulfonated indanthrone blue derivative of formula II

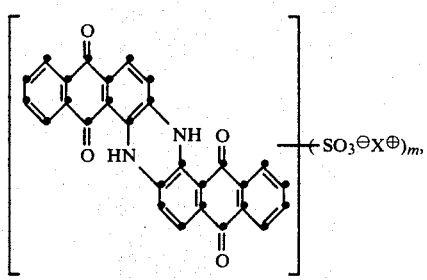

wherein $X^{\oplus}$ is $H^{\oplus}$ or a group of the formula $M^{n\oplus}/n$ or $N^{\oplus}(R)(R_1)(R_2)(R_3)$, M is a monovalent, divalent or trivalent metal cation, n is 1, 2 or 3, each of R, $R_1$, $R_2$ and $R_3$ independently is hydrogen, $C_1$-$C_{18}$alkyl, $C_5$-$C_6$cycloalkyl, phenyl or phenyl which is substituted by $C_1$-$C_{18}$alkyl, or $R_2$ and $R_3$, together with the linking nitrogen atom, are a pyrrolidine, imidazolidine, piperidine, piperazine or morpholine radical, or $R_1$, $R_2$ and $R_3$, together with the linking nitrogen atom, are a pyrrole, pyridine, picoline, pyrazine, quinoline or isoquinoline radical, and m is a value from 0.2 to 3.

$X^{\oplus}$ is preferably $H^{\oplus}$ or, most preferably, a group of the formula $M^{n\oplus}/n$.

$X^{\oplus}$ as a group of the formula $M^{n\oplus}/n$ is for example an alkali metal cation, an alkaline earth metal cation, an aluminium cation or a transition metal cation, for example $Na^{\oplus}$, $K^{\oplus}$, $Mg^{2\oplus}$, $Ca^{2\oplus}$, $Sr^{2\oplus}$, $Ba^{2\oplus}$, $Mn^{2\oplus}$, $Cu^{2\oplus}$, $Ni^{2\oplus}$, $Cd^{2\oplus}$, $Co^{3\oplus}$, $Al^{3\oplus}$ and $Cr^{3\oplus}$, but is preferably an alkali metal cation or an alkaline earth metal cation (n=1 or 2) and, most preferably, is $Na^{\oplus}$ and $Ca^{2\oplus}$.

$C_1$-$C_{18}$Alkyl is for example methyl, ethyl, n-propyl, isopropyl, n-butyl, sec-butyl, tert-butyl, n-pentyl, tert-pentyl, hexyl, heptyl, octyl, decyl, dodecyl, tetradecyl, hexadecyl, heptadecyl or octadecyl.

R, $R_1$, $R_2$ and $R_3$ as $C_5$-$C_6$cycloalkyl may be cyclopentyl or, preferably, cyclohexyl.

R, $R_1$, $R_2$ and $R_3$ as phenyl substituted by $C_1$-$C_{18}$alkyl is preferably phenyl which is substituted by $C_{12}$-$C_{18}$alkyl.

$N^{\oplus}(R)(R_1)(R_2)(R_3)$ may be: $N^{\oplus}H_4$, $N^{\oplus}H_3CH_3$, $N^{\oplus}H_2(CH_3)_2$, $N^{\oplus}H_3C_2H_5$, $N^{\oplus}H_2(C_2H_5)_2$, $N^{\oplus}H_3C_3H_7$-iso, $N^{\oplus}H_3$-cyclohexyl, $N^{\oplus}H_2$-(cyclohexyl)$_2$, $N^{\oplus}H_2(CH_3)(C_6H_5)$, $N^{\oplus}H_3C_6H_5$, $N^{\oplus}H_3$-p-octadecylphenyl und $N^{\oplus}(CH_3)_4$.

Preferably m is 1.

The sulfonated indanthrone blue component (b) can be prepared by methods which are known per se, for example by sulfonation with oleum, sulfuric acid, liquid sulfur trioxide, with or without a catalyst such as boric acid (q.v. German patent specification 216 891), and, in a further optional step, by subsequent reaction with the desired metal salt, e.g. an acetate, chloride, nitrate or, sulfate, or with one of the suitable amines. The concentration of sulfonating agent and the reaction conditions depend closely on the number of sulfonic acid groups which it is desired to introduce into the indanthrone blue molecule.

The compositions of this invention can be prepared by mixing the individual indanthrone blue components (a) and (b) in the desired ratio or by partial sulfonation and subsequent reaction with a metal salt or amine as described above.

The ratios of the components of the novel compositions can freely vary. Preferred ratios are, however, from 0.2 to 10.0% by weight of component (b) to 99.8 to 90% by weight of component (a), most preferably from 2.0 to 6.0% by weight of component (b) to 98.0 to 94% by weight of component (a).

The addition of component (b) can be made before or after conditioning of the pigment. By conditioning is meant preparing a finely particulate form of indanthrone blue, for example by precipitation in alkaline medium (vatting), precipitation in sulfuric acid, dry grinding with or without salt, solvent or wet grinding or, preferably, kneading in the presence of salts.

Depending on the method of conditioning or on the end use, it can be advantageous to add specific amounts of texture improving agents to the pigment before or after conditioning, besides the addition of sulfonated indanthrone blue. Suitable texture improving agents are, in particular, fatty acids of not less than 18 carbon atoms, for example stearic or behenic acid or the amides or metal salts thereof, preferably magnesium salts, as well as plasticisers, waxes, resin acids such as abietic acid, colophonium soap, alkyl phenols or aliphatic alcohols such as stearyl alcohol or vicinal diols such as dodecane-1,2-diol, and also modified colophonium/-maleate resins or fumaric acid/colophonium resins. The texture improving agents are preferably added in amounts of 0.1 to 30% by weight, most preferably of 2 to 15% by weight, based on the final product.

The compositions of this invention are suitable for use as pigments for colouring high molecular organic material.

Examples of high molecular organic materials which may be coloured or pigmented with the compositions of this invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

The above high molecular compounds may be singly or as mixtures in the form of plastics, melts or of spinning solutions, varnishes, paints or printing inks. Depending on the end use, it is advantageous to use the pigments as toners or in the form of preparations. The compositions of the invention are preferably employed in an amount of 0.1 to 10% by weight, based on the high molecular organic material to be pigmented.

The pigmenting of the high molecular organic compounds with the compositions of the invention is carried out for example by incorporating such a composition, optionally in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the composition into the polymers. To obtain different shades, it is also possible to add fillers or other chromophoric components such as white, coloured or black pigments, in any amount, to the high molecular organic compounds, in addition to the composition of this invention.

For pigmenting varnishes and printing inks, the high molecular organic materials and the compositions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or prints, have good allround fastness properties such as good dispersibility, high transparency, good fastness to over-spraying, migration, heat, light, and weathering.

In addition, compared with unsulfonated indanthrone blue, the compositions of the invention have greater colour strength, improved rheology, especially in varnishes and printing inks, exhibit fewer separating phenomena such as floating out when using white pigments concurrently, have a lesser tendency to flocculate and, in finishes, have a higher gloss.

Because of the good rheological properties of the pigment compositions of this invention, it is possible to prepare varnishes with higher loadings of pigment.

The compositions of this invention are preferably suitable for colouring aqueous and/or solvent-containing varnishes, especially automotive varnishes.

The invention is illustrated by the following Examples.

EXAMPLE 1

A steel vessel is charged with 1500 g of steel balls of 1.2 cm diameter, 150 g of nails, 135 g of aluminium sulfate.$16H_2O$, 15 g of crude indanthrone blue, 0.75 g of indanthrone blue sulfonic acid obtained by the process described in German patent specification 216 891 (m=1), and 3.2 ml of cyclohexanol. The steel vessel is closed and rolled on a roller bed for 72 hours. The grinding stock is separated from the steel balls and nails, added to 500 ml of water containing 2.5 ml of concentrated sulfuric acid, and the pigment suspension is stirred for 2 hours at 80°–90° C. The pigment is isolated by filtration at 30° C. and the filter cake is washed free of salt with water, dried at 80° C. under vacuum and pulverised. The blue pigment so obtained gives very strong colourations of high saturation when incorporated in varnishes.

EXAMPLE 2

10 g of crude indanthrone blue and 0.3 g of indanthrone blue sulfonic acid (m=1) are stirred at room temperature for 2 hours in 60 ml of concentrated sulfuric acid. The mixture is added dropwise to ice-water at a temperature below 4° C. The batch is stirred for another 2 hours at 80° C., filtered, and the filter cake is washed until neutral. The filter cake is then suspended in 200 ml water and the suspension is heated to 70° C. Then 1.0 g of dodecane-1,2-diol is added, the mixture is stirred for 30 minutes at 70° C., then cooled to 30° C. and filtered. The filter cake is washed with water and dried at 80° C. The blue pigment so obtained is most suitable for colouring varnishes and gives colourations of high colour strength, excellent gloss and high saturation with good fastness properties.

EXAMPLE 3

A 500 ml laboratory kneader is charged with 27 g of crude indanthrone blue, 0.7 g of indanthrone blue sulfuric acid (m=1), 3.7 g of hydrogenated abietic acid, 130 g of NaCl and 44 ml of diacetone alcohol. The mixture is kneaded for 6 hours without cooling, the temperature rising to 40° C. The concentrate is charged into 2 liters of water and stirred for 3 hours. The pigment is isolated by filtration and the filter cake is washed free of salt with water, dried at 80° C. and pulverised. The blue pigment so obtained is most suitable for incorporation in plastics and varnishes and gives colourations of high colour strength and saturation with good fastness properties. The varnishes prepared therewith have excellent rheological properties and have no tendency to flocculate.

EXAMPLE 4

The procedure of Example 3 is repeated, except for using 1.4 g instead of 0.7 g of indanthrone blue sulfonic acid. The resultant blue pigment has comparably good colouristic and even better rheological properties.

EXAMPLE 5

The procedure of Example 3 is repeated, except for using 2.4 g instead of 0.7 g of indanthrone blue sulfonic acid. The resultant blue pigment has comparably good colouristic and even better rheological properties.

EXAMPLE 6

The procedure of Example 3 is repeated, except for using a mixture of 120 g of NaCl and 15 g of $CaCl_2$ instead of 130 g of NaCl. The indanthrone blue pigment so obtained contains c. 2.7% of the calcium salt of indanthrone blue sulfonic acid and has comparably good pigment properties.

EXAMPLE 7

The procedure of Example 3 is repeated, except for using a mixture of 120 g of NaCl and 10 g of aluminium sulfate instead of 130 g of NaCl. The indanthrone blue pigment so obtained contains c. 2.7% of the aluminium salt of indanthrone blue sulfonic acid and has comparably good pigment properties.

EXAMPLE 8

The procedure of Example 4 is repeated, except for using a mixture of 120 g of NaCl and 10 g of $SrCl_2$ instead of 130 g of NaCl. The indanthrone blue pigment so obtained contains c. 5.5% of the Sr salt of indanthrone blue sulfonic acid and has comparably good pigment properties.

EXAMPLE 9

The procedure of Example 3 is repeated, except for using a mixture of 120 g of NaCl and 10 g of $BaCl_2$ instead of 130 g of NaCl. The indanthrone blue pigment so obtained contains c. 5.5% of the barium salt of indanthrone blue sulfonic acid and has comparably good pigment properties.

EXAMPLE 10

The procedure of Example 4 is repeated, except for using a mixture of 120 g of NaCl and 15 g of $MgCl_2$ instead of 130 g of NaCl. The indanthrone blue pigment so obtained contains c. 5.5% of the magnesium salt of indanthrone blue sulfonic acid and has comparably good pigment properties.

EXAMPLE 11

A 500 ml laboratory kneader is charged with 27.5 g of crude indanthrone blue, 3.7 g of hydrogenated abietic acid, 130 g of NaCl and 44 ml of diacetone alcohol. The mixture is kneaded for 6 hours without external cooling, whereupon the temperature rises to 40° C. The concentrate is then charged into 2 liters of water and stirred for 3 hours. The pigment is isolated by filtration, and the filter cake is washed free of salt with water and resuspended in 300 ml of water. The suspension is heated to 70° C., then 1.4 g of the sodium salt of indanthrone blue sulfonic acid are added ($m=1$) and the batch is stirred for 30 minutes at 70° C. The pigment suspension is then cooled to 30° C. and the pigment is isolated by filtration, washed with water, dried at 80° C. and pulverized. The blue pigment so obtained has excellent rheological properties when incorporated in varnishes, high colour strength and saturation an excellent fastness to weathering. When incorporated in plastics, the pigment has good dispersibility.

EXAMPLE 12

The procedure of Example 11 is repeated, except for omitting the addition of 3.7 g of hydrogenated abietic acid. The very productive blue pigment so obtained has excellent rheological properties and, when incorporated in varnishes, has only a slight tendency to flocculate.

EXAMPLE 13

In a 500 ml glass bead mill having a diameter of 8 cm, 13.5 g of crude indanthrone blue, 1.5 g of finely particulate hydrogenated abietic acid, 0.7 g of the sodium salt of indanthrone blue sulfonic acid ($m=1$), 125 g of water, 400 g of glass beads of 3.5–4.0 mm diameter are stirred for 12 hours at 320 rpm, with external cooling. The speed of rotation of the metal paddle stirrer of 5.5 cm diameter is 0.92 m/sec. The pigment suspension is separated from the glass beads, which are washed with water, and then filtered. The pigment is dried at 80° C., affording 13.5 g of a blue pigment containing c. 4% of the sodium salt of indanthrone blue sulfonic acid which, when incorporated in varnishes, gives very strong colourations of high saturation and good fastness properties and which are resistant to flocculation.

EXAMPLE 14

The procedure of Example 13 is repeated, except for using a mixture of 100 g of water and 25 g of ethylene glycol instead of 125 g of water. The pigment so obtained has comparably good colouristic properties and very good dispersibility.

EXAMPLE 15

A 500 ml laboratory kneader is charged with 27 g of crude indanthrone blue, 130 g of NaCl and 44 ml of diacetone alcohol. The mixture is then kneaded for 6½ hours while cooling externally with water. The concentrate is charged into 2 liters of water and stirred for 3 hours. The pigment is isolated by filtration and washed free of salt with water. The moist filter cake is resuspended in 400 ml of water and to the suspension are then added 1.4 g of the n-butylammonium salt of indanthrone blue sulfuric acid ($m=1$), obtained by reacting indanthrone blue sulfuric acid with n-butylamine ($m=1$), and 0.6 g of laurylamine. The batch is then heated to 80° C., stirred for 30 minutes at 80° C. and cooled to 20° C. The pigment is isolated by filtration and the filter cake is washed, dried at 80° C. and pulverised. When incorporated in varnishes, the pigment so obtained is very productive, resistant to flocculation, and gives blue colourations of high saturation.

EXAMPLE 16

15 g of leucoindanthrone in the form of a moist filter cake are added to a mixture of 150 g of water, 9 g of 50% sodium hydroxide solution, 1.2 g of hydrogenated abietic acid and 1.2 g of sodium dithionite. After addition of 220 g of glass beads (diameter c. 1 mm), the aqueous suspension of the leucoindanthrone is stirred with a high-speed impeller at c. 2000 rpm and 25°–30° C. with admission of air. The pigment suspension is separated from the glass beads, which are washed with 300 ml of water. The combined suspensions are adjusted to pH 5.0 with dilute hydrochloric acid. The pigment is then isolated by filtration, washed with water and resuspended in 200 ml of water. To the suspension are added 0.75 g of the sodium salt of indanthrone blue sulfuric acid (m=1) and the batch is heated to 70° C., stirred for 30 minutes at 70° C., then cooled to 25° C. The pigment is isolated by filtration and the filter cake is washed with water and dried at 80° C. When incorporated in varnishes, the powdered pigment gives very strong blue colourations of excellent fastness properties.

EXAMPLE 17

A mixture of
130 parts of steatite balls (diameter=8 mm)
47.5 parts of a thermosetting acrylic resin varnish consisting of:
  41.3 parts of VIACRYL ® VC 373 acrylic resin, 60% (ex VIANOVA Kunstharz AG),
  16.3 parts of MAPRENAL ® TTX melamine resin, 55%, (ex HOECHST AG),
  32.8 parts of xylene,
  4.6 parts of ethyl glycol acetate,
  2.0 parts of butyl acetate, and
  1.0 part of silicone oil A ®, 1% in xylene (ex Bayer), and
2.5 parts of the mixture of indanthrone blue pigments obtained in Example 1
is dispersed in a 200 ml glass bottle with twist-off stopper for 72 hours on a roller gear bed. The steatite balls are removed and then 8.0 parts of the dispersed masstone mixture,
0.6 part of ALCOA ® aluminium paste (60–65%. aluminium content, ex Aluminium Corp. of America),
1.0 part of methyl ethyl ketone and
18.4 parts of the above thermosetting acrylic varnish
are thoroughly mixed and the mixture is sprayed onto aluminium sheets and subsequently baked for 30 minutes at 130° C., to give very strong blue metal effect finishes of excellent fastness properties.

Comparably good finishes are obtained by adding a pigment of any one of Examples 2 to 16 instead of the pigment of Example 1.

EXAMPLE 18

A mixture of 130 g of steatite balls having a diameter of 8 mm, 47.5 g of alkyd/melamine stoving varnish consisting of 60 g of Beckosol ® 27-320 (Reichhold Chemie AG), 60% in xylene, 36 g of Super-Beckamin ® 13-501 (Reichhold Chemie AG), 50% in a 2:1 mixture of xylene/butanol, 2 g of xylene and 2 g of ethylene glycol monomethyl ether, and 2.5 g of the mixture of indanthrone blue pigments obtained in Example 3 are dispersed in a 20 ml glass flask with twist-off cap for 120 hours on a roller gear bed. After separating the glass balls, 2.4 g of the dispersed full shade mixture are mixed with 60 g of titanium dioxide Kronos ® RN 59 (Kronos Titan GmbH) and a further 24.0 g of the alkyd/melamine stoving varnish. The coloured varnish solution is sprayed onto aluminium sheets and subsequently stoved for 30 minutes at 130° C. to give very strong blue finishes of excellent fastness properties.

EXAMPLE 19

A mixture of 1.0 g of the mixture of indanthrone blue pigments obtained in Example 4, 1.0 g of antioxidant ( ®IRGANOX 1010, ex Ciba-Geigy AG) and 1000 g of high density polyethylene granules ( ®Vestolen A 60-16, ex Chem. Werke Hüls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong blue shades of excellent fastness properties.

EXAMPLE 20

0.6 g of the mixture of indanthrone blue pigments obtained in Example 6 are mixed with 67 g of polyvinyl chloride, 33 g of dioctyl phthalate, 2 g of dibutyltin laurate and 2 g of titanium dioxide and the mixture is processed to a thin sheet on a roll mill for 15 minutes at 160° C. The PVC sheet so obtained is coloured in a very strong blue shade which is fast to migration and light.

EXAMPLE 21

1000 g of polypropylene granules ( ®DAPLEN PT-55, ex Chemie Linz) and 20 g of a 50% pigment preparation consisting of 10 g of the mixture of indanthrone blue pigments obtained in Example 7 and 10 g of magnesium behenate are thoroughly mixed in a mixing drum. The granules so obtained are melt spun at 260°–285° C. to blue filaments of good lightfastness and textile fibre properties.

EXAMPLE 22

(A) 8 g of the mixture of indanthrone blue pigments obtained in Example 4 and (B) 23 g of titanium dioxide (KRONOS ® RN 59, ex KONOS TITAN GmbH) are each thoroughly dispersed separately in a DISPERMAT ® disperser (ex Hediger, Basserdorf) with 1 mm glass beads in a solution consisting of 21.5 g of cellulose acetobutyrate (25% in butyl acetate), 1 g of zirconium octoate 6 (NUODEX ®), 12 g of an aromatic solvent (SOLVESSO ® 150, ex ESSO), 17.5 g of butyl acetate and 13 g of xylene.

After removal of the glass beads, each of the two dispersions is mixed with 24 g of DYNAPOL ® H 700 polyester resin (60%, ex DYNAMIT NOBEL) and 3 g of MAPRENAL ® MF 650 melamine resin (55%, ex HOECHST AG). Then 12.5 g of the blue pigment varnish suspension are mixed with 45.0 g of the white one. The pigment varnish so obtained is sprayed onto aluminium sheets and then baked at 130° C., to give strong finishes of excellent gloss.

What is claimed is:
1. A composition comprising
(a) an indanthrone blue pigment of formula I

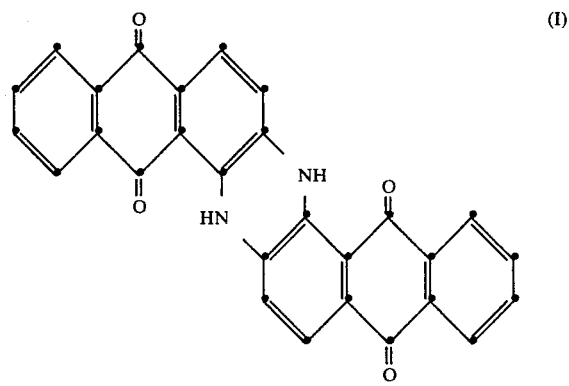

and
(b) a sulfonated indanthrone blue derivative of formula II

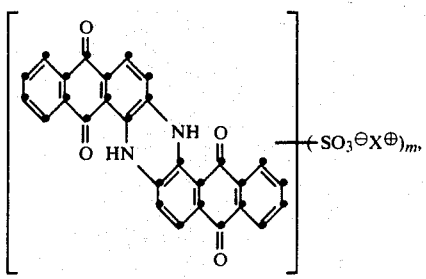

(II)

wherein $X^{\oplus}$ is $H^{\oplus}$ or a group of the formula $M^{n\oplus}/n$ or $N^{\oplus}(R)(R_1)(R_2)(R_3)$, M is a monovalent, divalent or trivalent metal cation, n is 1, 2 or 3, each of R, $R_1$, $R_2$ and $R_3$ independently is hydrogen, $C_1$-$C_{18}$alkyl, $C_5$-$C_6$cycloalkyl, phenyl or phenyl which is substituted by $C_1$-$C_{18}$alkyl, or $R_2$ and $R_3$, together with the linking nitrogen atom, are a pyrrolidine, imidazolidine, piperidine, piperazine or morpholine radical, or $R_1$, $R_2$ and $R_3$, together with the linking nitrogen atom, are a pyrrole, pyridine, picoline, pyrazine, quinoline or isoquinoline radical, and m is a value from 0.2 to 3.

2. A composition according to claim 1, wherein m is 1 in the sulfonated indanthrone blue derivative of formula II.

3. A composition according to claim 1, wherein $X^{\oplus}$ in the sulfonated indanthrone blue derivative of formula II is a group of the formula $M^{n\oplus}/n$, wherein $M^{n\oplus}$ is an alkali metal cation or an alkaline earth metal cation and n is 1 or 2.

4. A composition according to claim 3, wherein $M^{n\oplus}$ is a sodium or calcium cation.

5. A composition according to claim 1, wherein the ratio of component (a) to component (b) is 99.8 to 90% by weight to 0.2 to 10.0% by weight.

* * * * *